US009096251B2

(12) United States Patent
Bowden

(10) Patent No.: US 9,096,251 B2
(45) Date of Patent: Aug. 4, 2015

(54) HANDTRUCK WITH FOOTKICK TILT DEVICE

(71) Applicant: Patrick J. Bowden, Peotone, IL (US)

(72) Inventor: Patrick J. Bowden, Peotone, IL (US)

(73) Assignee: Brennan Equipment and Manufacturing, University Park, IL (US)

( * ) Notice: Subject to any disclaimer, the term of this patent is extended or adjusted under 35 U.S.C. 154(b) by 0 days.

(21) Appl. No.: 14/016,874

(22) Filed: Sep. 3, 2013

(65) Prior Publication Data
US 2014/0159328 A1 Jun. 12, 2014

Related U.S. Application Data

(60) Provisional application No. 61/734,483, filed on Dec. 7, 2012.

(51) Int. Cl.
B62B 5/00 (2006.01)
B62B 1/12 (2006.01)

(52) U.S. Cl.
CPC ............... B62B 1/12 (2013.01); B62B 2203/05 (2013.01)

(58) Field of Classification Search
CPC ............. B62B 1/12; B62B 1/14; B62B 1/10; B62B 2203/05; B62B 1/264
USPC ........ 280/47.12, 47.131, 47.17, 47.18, 47.19, 280/47.23, 47.24, 47.26, 47.27, 47.28, 280/47.29
See application file for complete search history.

(56) References Cited

U.S. PATENT DOCUMENTS

| 193,401 | A | * | 7/1877 | Ferris | 280/47.27 |
| 1,358,881 | A | * | 11/1920 | Sabin | 414/456 |
| 1,539,933 | A | * | 6/1925 | Britton | 280/47.29 |
| 1,719,763 | A | * | 7/1929 | Gullborg | 280/47.27 |
| 2,147,764 | A | * | 2/1939 | Brown | 188/5 |
| 2,242,067 | A | * | 5/1941 | Harris | 280/5.32 |
| 2,546,876 | A | * | 3/1951 | Sutherland | 280/47.27 |
| 2,574,825 | A | * | 11/1951 | Guild | 414/456 |
| 2,650,834 | A | * | 9/1953 | Coval | 280/43 |
| 3,046,035 | A | * | 7/1962 | Nichols | 280/47.27 |
| 3,556,548 | A | * | 1/1971 | Aplin | 280/47.27 |
| 3,893,687 | A | * | 7/1975 | Victor | 280/47.27 |
| 4,114,771 | A | * | 9/1978 | Heuckroth | 414/457 |
| 4,241,930 | A | * | 12/1980 | Bell et al. | 280/47.29 |
| 4,257,729 | A | * | 3/1981 | Morissette | 414/490 |
| 4,741,659 | A | * | 5/1988 | Berg | 414/450 |
| 5,256,025 | A | | 10/1993 | Williams | |
| 6,062,328 | A | * | 5/2000 | Campbell et al. | 180/65.6 |
| 6,237,925 | B1 | * | 5/2001 | Koenig | 280/47.29 |
| 7,431,314 | B2 | * | 10/2008 | Donaldson | 280/47.27 |
| 7,740,251 | B2 | * | 6/2010 | Simmons | 280/47.27 |
| 8,136,822 | B2 | * | 3/2012 | Harrison | 280/47.17 |
| 8,235,401 | B1 | * | 8/2012 | Scriven et al. | 280/47.27 |
| 8,262,106 | B1 | * | 9/2012 | Suszynsky | 280/47.131 |

(Continued)

FOREIGN PATENT DOCUMENTS

DK EP 1 632 415 * 8/2006 ............... B62B 1/10

Primary Examiner — Brodie Follman
(74) Attorney, Agent, or Firm — Seyfarth Shaw LLP

(57) ABSTRACT

A handtruck has an elongated frame, with wheels mounted adjacent to the bottom of frame and forming a wheelbase. A load-bearing member, such as a base plate, is attached to the frame. A footkick is provided and is attached to the frame, the footkick extending rearwardly relative to the wheels, preferably with a part engageable by a person's foot. The footkick provides a lever for facilitating rotation of the frame about the wheelbase.

12 Claims, 4 Drawing Sheets

(56) References Cited

U.S. PATENT DOCUMENTS 8,714,580 B2* 5/2014 Raley et al. .................. 280/638
2004/0021280 A1* 2/2004 Peggs ......................... 280/47.24
2006/0082086 A1* 4/2006 Donaldson ................ 280/47.27
2010/0230918 A1* 9/2010 Harrison ................... 280/47.17
2014/0159328 A1* 6/2014 Bowden .................... 280/47.27

* cited by examiner

HANDTRUCK WITH FOOTKICK TILT DEVICE

RELATED APPLICATION

This application claims priority to provisional Patent Application No. 61/734,483, filed Dec. 7, 2012, the contents of which are herein incorporated by reference in their entirety.

FIELD OF THE INVENTION

The invention relates to handtrucks, and more particularly to a handtruck having a device for facilitating rotation of the handtruck about its wheel axis.

BACKGROUND

Handtrucks are used to move cargo manually from place to place. They generally comprise a plate or base upon which items are placed, and can be stacked, and a frame extending upwardly therefrom, to support stacked cargo. A set of wheels is typically provided at the bottom of the frame, and a handle toward the top of the frame which is graspable, for moving the handtruck. The frame is ordinarily tilted rearwardly to move the handtruck on the wheels.

SUMMARY OF THE INVENTION

In accordance with one aspect of the invention, an improved handtruck, which is an apparatus for moving loads manually, has a device which facilitates the rotation of the handtruck about a fulcrum, such as its wheel axis, as for tilting the handtruck for movement through an arc toward the user, as well as for placing the load plate of the handtruck on the ground after travel. In one embodiment, the handtruck has a frame with a set of wheels at the base of the frame. Other rotatable members, or a single movable member, such as a caster or roller ball, could be used. Extending rearwardly from the base, or near the base, is a member which presents a lever end that is engageable by a user's foot. This member takes the form of a footkick, such that a user can press upon the lever end with his or her foot, and thereby facilitate rotation of the frame, with its attached cargo plate. This is useful in both lifting the load for movement of the handtruck, but also can be employed in placing the plate with its load back on the ground.

In a preferred embodiment, the footkick is a rod which extends from a fixed attachment point on the handtruck frame at a distal part or end, and rearwardly at a slightly upward angle from the frame. The footkick need not be affixed to the frame, however, but could rotate on a wheel axle and engage the frame, or simply engage some part of the handtruck to deliver the lever action. Here, rearwardly is relative to the plate upon which the load is carried, and upward is relative to the ground. An endpiece may be provided extending laterally at the rearward or proximal part or end of the footkick, for better foot engagement. The material used for the footkick can be metal, plastic or composite material, or indeed any material that will yield a sufficiently rigid lever arm.

In accordance with another aspect of the invention, a handtruck has an elongated frame, with wheels mounted adjacent to the bottom of frame and forming a wheelbase. A load-bearing member, such as a base plate, is attached to frame, preferably adjacent the bottom of the frame. A footkick is provided and is attached to the frame. The footkick extends rearwardly relative to the frame and the wheels, most preferably with a widened part easily engageable by a person's foot. The footkick provides a lever for facilitating rotation of the frame about the wheelbase.

In a variation of the invention, the footkick can be made releasably attachable, such that it may be affixed to the frame, and then removed as desired.

Other advantages, aspects and particulars of the invention will be further understood upon consideration of the following detailed description of an embodiment, taken in conjunction with the drawings, in which:

DETAILED DESCRIPTION

Figure 1:
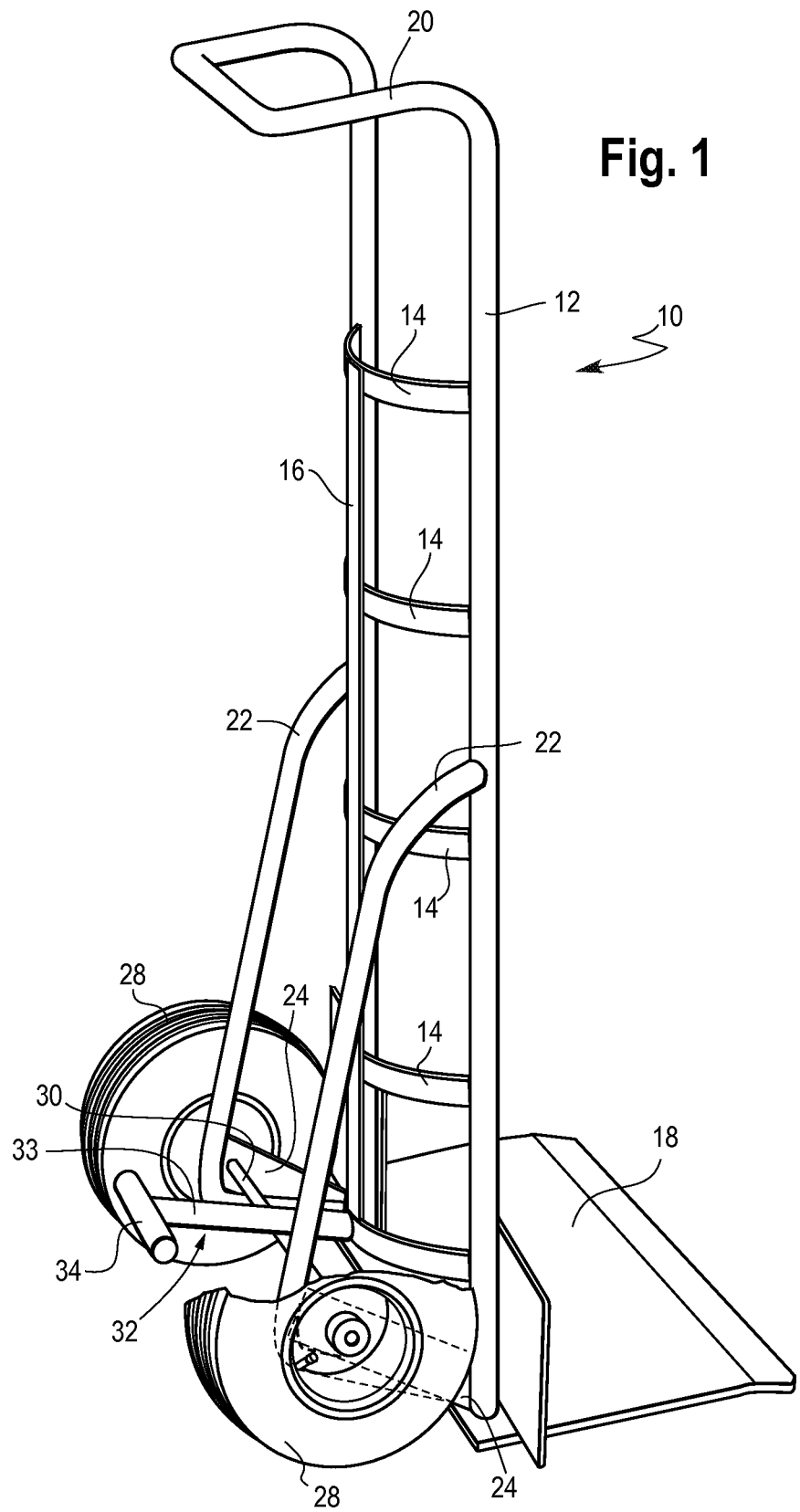
FIG. 1 is a side view, slightly in perspective, of a handtruck made in accordance with one embodiment of the invention.
Figure 2:
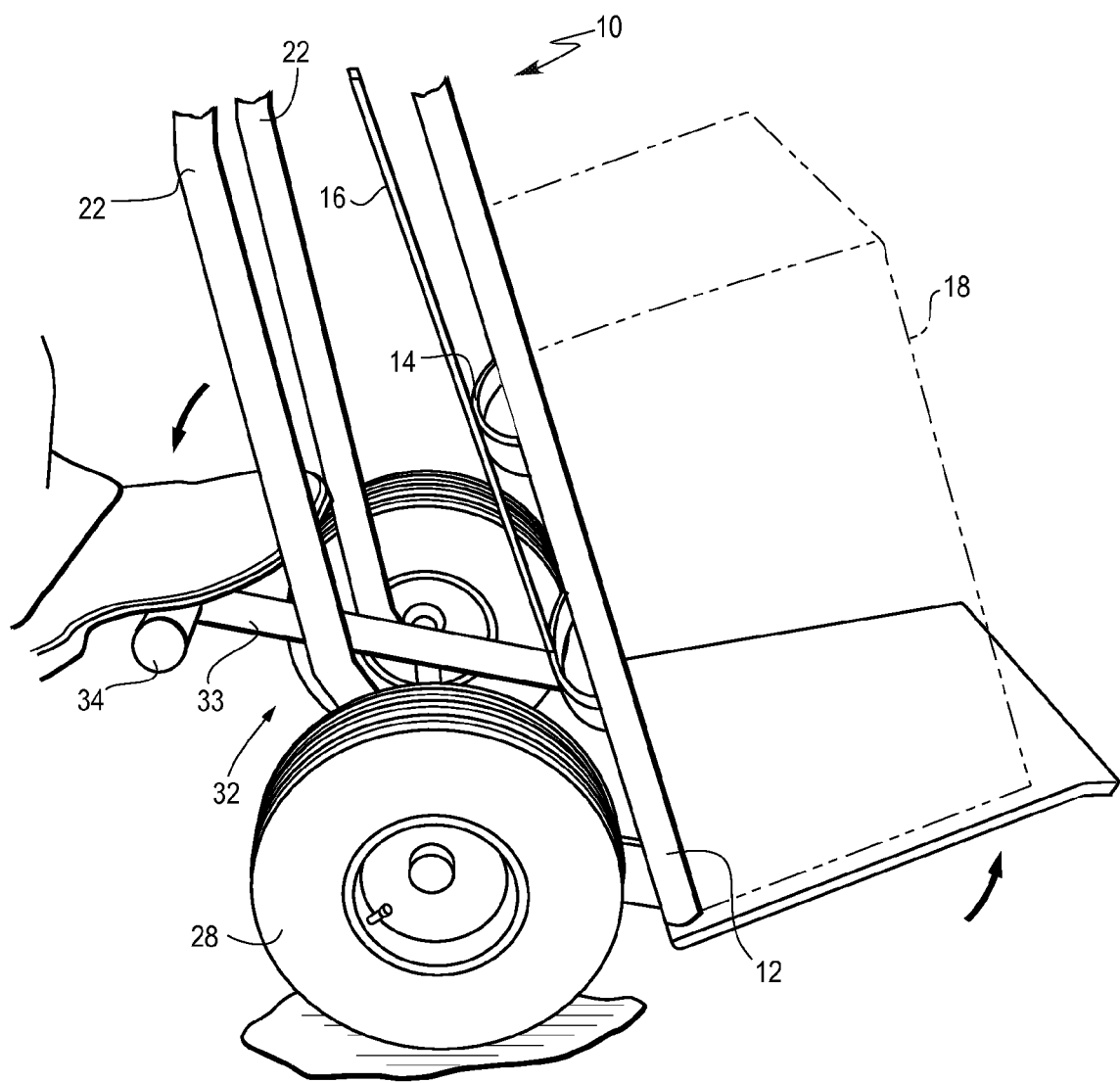
FIG. 2 is an enlarged perspective view of the lower end of the embodiment of FIG. 1, with the footkick engaged.
Figure 3:
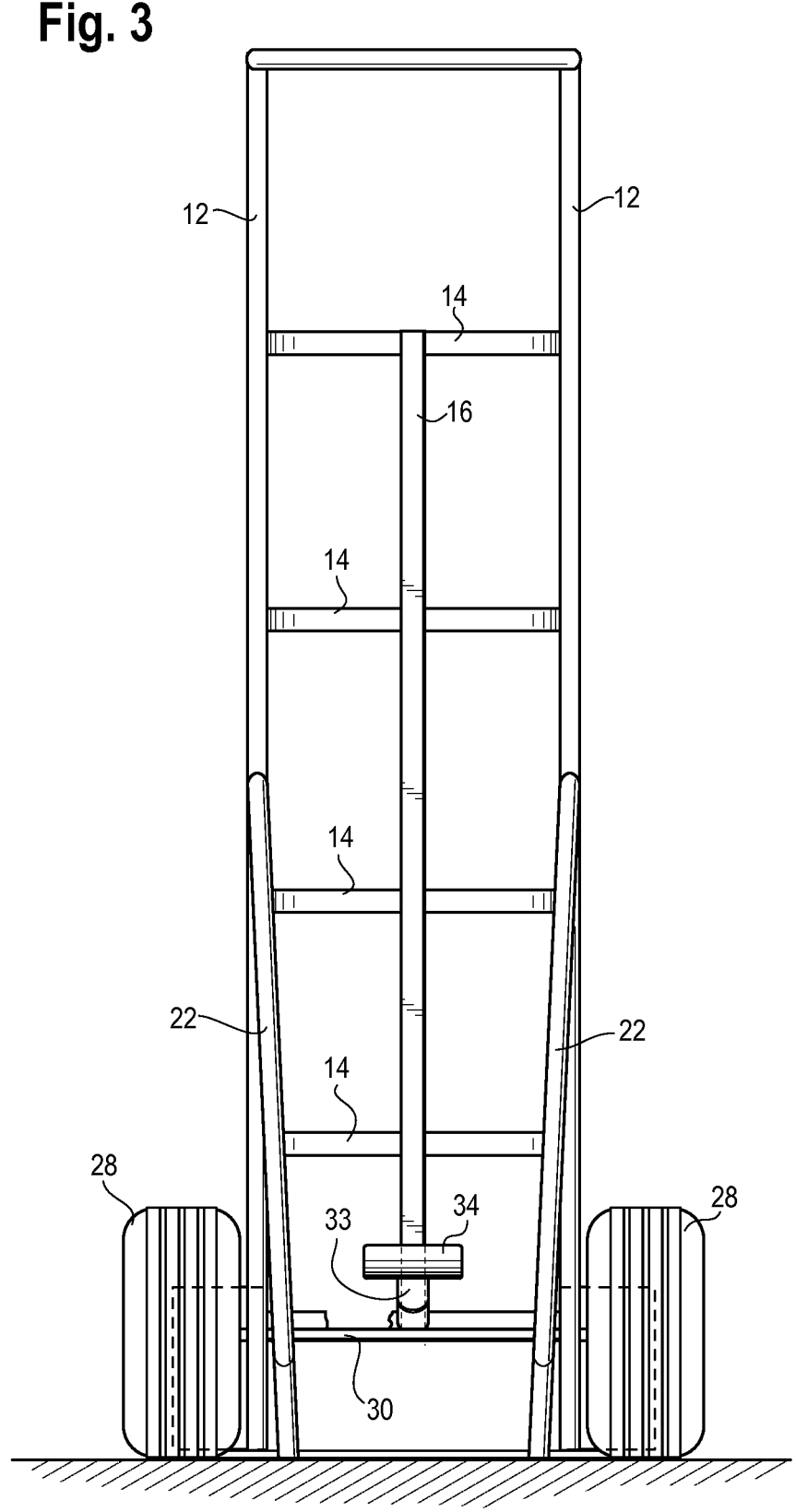
FIG. 3 is a rearview of the handtruck of FIGS. 1 and 2.

A handtruck in one embodiment constructed in accordance with an aspect of the invention is shown in FIGS. 1 through 3. This embodiment has an elongated frame 10 made of two vertical bars or rods 12, with five cross spans 14 extending therebetween, spaced along the bars 12. There is a central vertical span 16 at approximately the middle of the frame, and joining the cross spans 14. A cargo load plate 18 is affixed to the bottom of the rods 12. At the top of the frame is a handle 20, which can be an intermediate portion of a single tubular element which has been bent into the shape of the two vertical rods 12 with the handle 20 extending rearwardly therefrom at the top of the frame 10. It will be understood that the general structure of the frame 10 is conventional, and may take many different forms understood by those of skill in the art. Various elements are connected via welding, for example. Frame is used expansively herein, and is generally a structure to which a load to be moved is attached or carried.

Extending at the back of the frame are a pair of struts 22. At the bottom of the struts are wheel brackets 24, which extend and are affixed to the bottom of the frame 10. There is a cross bar 26 connecting the brackets 24 and the struts 22.

A pair of wheels 28 are mounted in conventional fashion to an axel 30. The axel extends through appropriate openings in the brackets 24. The cross bar 26 is located slightly rearwardly and upwardly of the axel 30. How the wheels 28 are mounted is, of course, a matter of choice. Other rotary, or even slidable members, or even a single such member, could be used.

Affixed to the frame 10 is a footkick 32. The footkick has an elongated bar or rod 33 having one end (its distal end) attached to the bottom of the frame 10 at the juncture between the lowest cross span 14 and the central span 16, as by welding thereto. At the other end (the proximal end) of the kick rod 33 is a lateral element 34, which is provided to give a better engagement surface for a person's foot. The kick rod 33 extends rearwardly at a slight upward angle. It preferably is also in contact with, or affixed to, the top of the cross bar 26. It will be understood that the footkick may be made of many kinds of materials, so long as a sufficiently rigid element results that will withstand the lever forces applied. Furthermore, while a rod or bar is noted as a particularly useful form, the footkick may take the form of other elongated elements that do the job.

In use, the footkick 32 functions as a lever. A user may step or press upon the lateral element 34, pressing the footkick 32 downwardly, while the user is also pulling rearwardly on the handle 20. This facilitates pitching the frame 10 and its plate 18 back about the pivot or fulcrum formed by the wheel axel 30. In like measure, when the user has moved the handtruck and is placing the load (plate) back on the ground, the footkick 32 can be used to assist in that action.

As a lever, the footkick 32 may be of any suitable length. The longer the lever-arm, the more easily the load may be tilted (levered). Most preferably, the distal end of the lever (away from the user) is near the plate 18. The proximal end (where the foot engages) will preferably extend beyond the back of the wheels 28, with a fulcrum formed more or less around the wheel axis. A tilt upwardly for the footkick 32 is indicated in these embodiments, so as to provide a placement for the footkick lower to the ground, but with sufficient height to the lateral element 34 (or end of the kick rod 33) so that the proximal end of the footkick will not interfere with sufficient rearward rotation of the hand truck.

Figure 4:
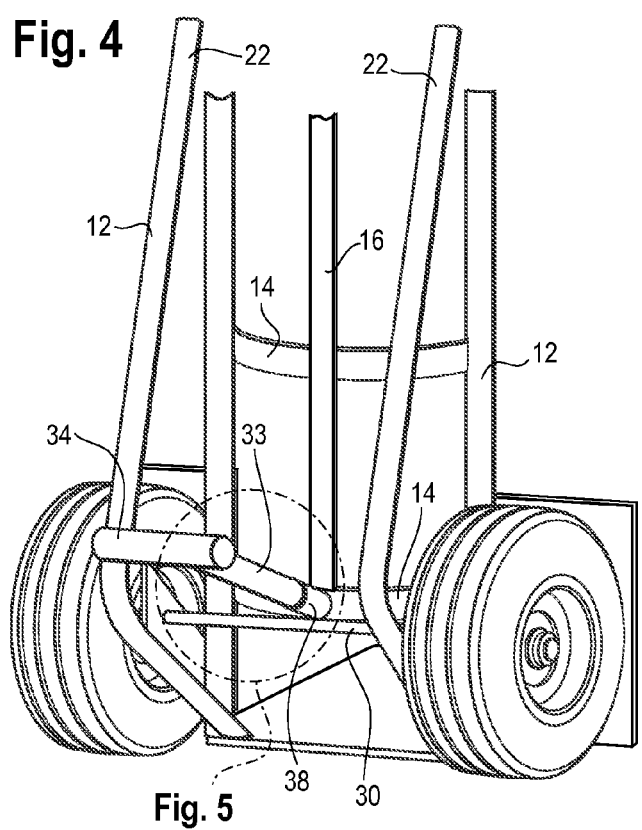
FIG. 4 is a partial perspective rear view showing an alternative version with a removable footkick.
Figure 5:
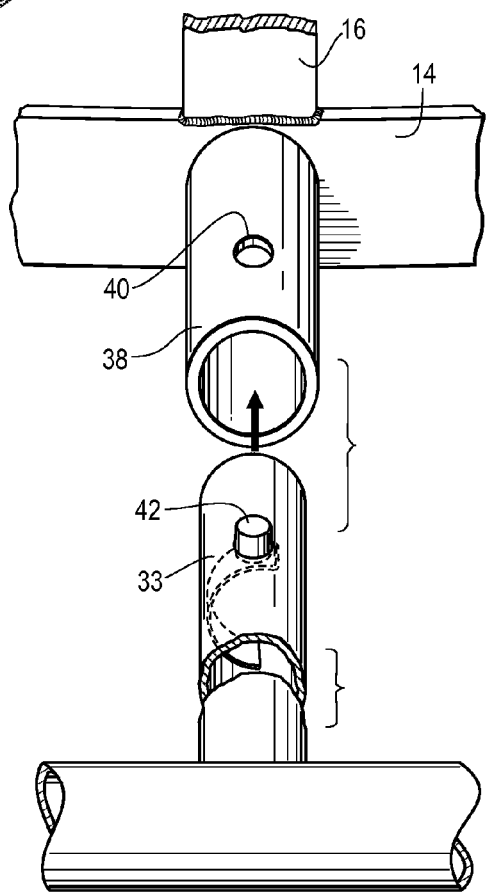
FIG. 5 is an enlarged view of a mount for affixing a removable footkick.

A variant embodiment is shown in FIGS. 4 and 5. Here, the footkick 32 is made to be removably mounted or affixed to the frame 10. To that end, a short cylindrical receptacle, collar or well 38 is provided on the frame, such as welded to a cross-span 14. It has a hole or aperture 40. The end of the kickrod 33, which in this embodiment is a hollow metal tube, is provided with a spring-loaded nub 42 of conventional type, as used to connect tubing members together and well known in the art. The nub 42 extends through an aperture in the kickrod 33. The outer diameter of the kickrod 33 is made to fit within the inner diameter of the receptacle 38, which forms a socket, in a generally snug fit, with the nub 42 then extending through the hole 40 in the receptacle 38 to locate the kickrod in place. The nub 42 can be pressed inwardly relative to the kickrod 33 to release the kickrod from the receptacle. The kickrod 33 could be arranged to be rearwardly attached to the handtruck in other ways, such as fitting over a mount. It could be attached to the axle 30, for instance, and rotate to engage with part of the frame.

Thus, while the invention has been described with respect to a particular embodiment, those of skill in the art will recognize modifications, substitutions, variations and other embodiments which will fall within the scope and spirit of the invention, as set forth in the following claims.

What is claimed is:

1. An improved handtruck, comprising;
    an elongated frame having a top and bottom, and a front and back;
    a cross-span extending across the frame and providing structural support thereto;
    a wheel assembly having wheels and an axle coupled to the wheels, the wheel assembly coupled to the frame and forming a wheelbase;
    a load-bearing member attached to said frame;
    a footkick attached to the cross-span, said footkick extending rearwardly relative to said frame back and said wheels, said footkick having a part engageable by a person's foot, said footkick being spaced from said axle.

2. The improved handtruck of claim 1, wherein said footkick is an elongated rod having one end affixed to said back of said frame adjacent said frame bottom, with another end of said rod extending at an upward angle relative to the ground.

3. The improved handtruck of claim 2, wherein said rod has a lateral element at said another end which is engaged by a person's foot.

4. An apparatus for moving loads manually, comprising;
    a frame having a top and bottom, and a front and back;
    rotary members mounted to an axle adjacent to said bottom of said frame and forming a rollerbase upon which said frame can be moved across a surface;
    a load-bearing member attached to said frame on which a load is to be carried;
    a footkick attached to said frame, said footkick extending rearwardly relative to said frame back and having a distal part near or at said frame bottom, said footkick having a proximal part engageable by a person's foot, said footkick providing a lever for facilitating rotation of said frame in an arc where said frame top moves toward a user, said footkick being spaced from said axle.

5. The apparatus of claim 4, wherein said footkick is an elongated rod having a distal end affixed to said back of said frame adjacent said frame bottom, with a proximal end of said rod extending at an upward angle relative to the ground.

6. The apparatus of claim 5, wherein said rod has a lateral element at said proximal end which is engaged by a person's foot.

7. The apparatus of claim 4, wherein said rotary members are wheels which are spaced apart from one another, and said footkick is an elongated rod having a distal end affixed to said back of said frame adjacent said frame bottom, said footkick being located above an axis defined between centers of rotation of said wheels.

8. The apparatus of claim 7, wherein said rod has a lateral element at a proximal end which is engaged by a person's foot.

9. An apparatus for moving loads manually, comprising;
    a frame having a top and bottom, and a front and back;
    at least one member mounted adjacent to said bottom of said frame upon which said frame can be moved on a surface, the at least one member being coupled to an axle;
    a load-bearing part on said frame;
    a footkick mounted to the handtruck in a manner to allow rotation of said frame about a fulcrum point, said footkick extending rearwardly relative to said frame back and said rotatable member, said footkick having a part engageable by a person's foot, said footkick providing a lever for facilitating rotation of said frame about said fulcrum point, said footkick being spaced from said axle.

10. The improved handtruck of claim 1, wherein the footkick is fixed to the frame.

11. The apparatus of claim 4, wherein the footkick is fixed to the frame.

12. The apparatus of claim 9, wherein the footkick is fixed to the frame.

* * * * *